United States Patent [19]
Houben et al.

[11] Patent Number: 6,133,369
[45] Date of Patent: Oct. 17, 2000

[54] PRINTABLE SWELLING PASTE AND THE USE THEREOF

[75] Inventors: Jochen Houben, Kempen; Richard Mertens, Krefeld, both of Germany

[73] Assignee: Stockhausen GmbH & Co. KC, Krefeld, Germany

[21] Appl. No.: 09/350,889

[22] Filed: Jul. 12, 1999

Related U.S. Application Data

[63] Continuation of application No. 08/971,729, Nov. 17, 1997, abandoned.

[30] Foreign Application Priority Data

Apr. 24, 1997 [DE] Germany .................... 197 17 395

[51] Int. Cl.$^7$ ...................................... C08L 39/00
[52] U.S. Cl. ........................................ 524/555; 525/329.4
[58] Field of Search .................... 524/555; 525/329.4

[56] References Cited

U.S. PATENT DOCUMENTS

| | | |
|---|---|---|
| 4,049,607 | 9/1977 | Berghoff . |
| 4,265,795 | 5/1981 | Sekmakas et al. . |
| 4,473,678 | 9/1984 | Fink et al. . |
| 4,727,097 | 2/1988 | Kobayashi et al. . |
| 4,880,868 | 11/1989 | Le-Khac . |
| 5,166,254 | 11/1992 | Nickle et al. . |
| 5,399,269 | 3/1995 | Moradi-Araghi . |
| 5,447,986 | 9/1995 | Fox et al. . |
| 5,487,425 | 1/1996 | Ohno et al. . |
| 5,523,345 | 6/1996 | Diehl et al. . |
| 5,567,478 | 10/1996 | Houben et al. . |

FOREIGN PATENT DOCUMENTS

| | | |
|---|---|---|
| 0 077 618 | 4/1983 | European Pat. Off. . |
| 0 357 474 | 3/1990 | European Pat. Off. . |
| 0 372 981 | 6/1990 | European Pat. Off. . |
| 2 345 470 | 10/1977 | France . |
| 31 24 008 | 1/1983 | Germany . |
| 41 35 714 | 6/1992 | Germany . |
| 43 33 056 | 3/1995 | Germany . |
| 44 20 088 | 12/1995 | Germany . |
| 195 21 431 | 12/1996 | Germany . |
| 802740 | 10/1958 | United Kingdom . |
| 93/02115 | 2/1993 | WIPO . |

OTHER PUBLICATIONS

Japanese Patent No. 54112553, Sep. 1979 (Abstract).
Japanese Patent No. 01141938, Jun. 1989 (Abstract).
Soviet Union Patent No. 1509359, Sep. 1989 (Abstract).

*Primary Examiner*—Paul R. Michl
*Attorney, Agent, or Firm*—Oblon, Spivak, McClelland, Maier & Neustadt, P.C.

[57] ABSTRACT

The invention relates to a printable swelling paste which contains
1. polymers having carboxyl and amide group moieties, and
2. an aldehyde or an aldehyde-liberating compound
as components of the mixture. Optionally, the mixture may contain further additives, such as thickeners. The polymer component having carboxyl and amide groups is produced by free-radical copolymerization of monomers containing amide groups and monomers containing carboxyl groups, and other comonomers may be polymerized therein as well. The invention also relates to the use of said swelling paste in the production of absorbent fibers, fabrics and sheet materials such as films by applying the swelling paste onto the support material and subsequent thermal treatment.

4 Claims, No Drawings

PRINTABLE SWELLING PASTE AND THE USE THEREOF

This application is a continuation of 08/971,729, filed Nov. 17, 1997, abandoned.

A Printable Swelling Paste and the Use Thereof The present invention relates to a printable swelling paste containing a mixture of polymers having carboxyl and amide group moieties, and aldehyde crosslinkers. The swelling paste may be stored for a long period of time, with no thickening or gelling taking place. It is applied onto support materials of most various kinds and crosslinked by exposure to heat. As a result, structures are formed having high absorptive capacity for water and aqueous liquids.

Superabsorbent polymers are known for a long time and commercially available in the form of powders, e.g., under the designation of FAVOR or CABLOC. However, the processing of powders is technically expensive and, once abraded particles give rise to breathable fines, not harmless in terms of occupational medicine.

While alternatively possible polymerizations of monomer solutions on prefabricated surfaces or filaments are known, they are a domain of chemical industry factories because of the protective gas technique required and the safety regulations to be observed and cannot be transferred to factories of other industrial sectors such as the printing and textile industries.

EP 188,091 describes absorptive porous sheet materials produced by padding a mixture of an aqueous solution of a non-crosslinked prepolymer with a crosslinker onto a nonwoven and subsequent thermal crosslinking. This process is disadvantageous in that the polyhaloalkanol, haloepoxyalkane and polyglycidyl ether type crosslinkers may be added just a short time before processing due to their reactivity, because otherwise undesirable thickening of the mixture takes place during storage, and the above-described crosslinkers are critical for health reasons.

EP 357,474 describes spraying of low-viscosity aqueous solutions of non-crosslinked polyacrylic acids on sheet fabrics made of cellulose and subsequent thermal crosslinking by simultaneously applied crosslinkers to give water-swellable gels. Multivalent metal ions, as well as epoxides, aziridines, polyglycidyl ethers are described as crosslinkers which, due to their cancerogenic potential, are barely usable anymore, the hygienics and food packaging industrial sectors being considered as particularly problematic. In addition, they give rise to early crosslinking already at room temperature when storing the coating solutions, so that further processing of the high-viscosity and/or gelled mass is no longer possible.

DE-OS-23 27 249 describes a washing procedure wherein water-insoluble, solid cation exchangers based on polymers of (meth)acrylic acid, (meth)acrylamide and formaldehyde or formaldehyde-amine condensation products are used. Polymerization of the monomers takes place in the presence of formaldehyde, resulting directly in crosslinked water-insoluble polymers. The polymer does not go through a separable water-soluble state where processing as a dissolved polymer would be possible.

Also, U.S. Pat. No. Re 32,649, page 7, mentions glyoxal as a possible crosslinking agent in the production of superabsorbers. However, as in DE-OS-23 27 249, a polymerization is involved resulting in crosslinked, water-insoluble polymers in a single step, where soluble intermediates cannot be isolated.

DE 195 21 431 A1 describes a process wherein reactive crosslinkers such as polyfunctional epoxides, aziridines, polyglycid ethers, and epihalohydrines are added to an aqueous solution of a pre-crosslinked polyacrylic acid just prior to the printing process. Although, a printable paste is already described therein, these reactive crosslinkers have the crucial disadvantage that the mixture of the two components cannot be stored for long time but must be prepared freshly every hour due to thickening which already begins at room temperature.

Therefore, the invention is based on the object of providing a printable paste which may be applied on a prefabricated sheet material in a single operation and, following a thermal aftertreatment, is capable of swelling in the presence of water or aqueous solutions, thereby multiplying its original volume. The finished paste should be capable of being stored for at least one week at room temperature, with no viscosity changes of the paste or swellability decrease occurring subsequent to processing. In addition, the paste must be free of readily inflammable or dangerous substances. Crosslinking should be possible at temperatures as low as 140° C. and, due to the thermal sensitivity of the support material and/or for economic reasons, may not take longer than 5 minutes at maximum, at temperatures from 160° C. on. Thereafter, crosslinking must be completed, and the coated substrate must have sufficient swellability and swelling rate. Furthermore, the gel produced should have sufficient stability.

Surprisingly, the object of the invention was accomplished using a mixture of two components, component 1 being an aqueous solution of a copolymer made of monomers containing carboxyl groups and amide groups, component 2 being an aldehyde crosslinker, and other additives may optionally be present in said mixture.

Thus, the invention is directed to a swelling paste made of
A) a component 1, consisting of an aqueous, partially or completely neutralized solution of a polymer produced by free-radical polymerization of mixtures of
  a) monomers containing amide groups, and
  b) monomers containing carboxyl groups and/or carboxylate groups, and optionally,
  c) other free-radical-polymerizable monomers, and
B) a component 2, consisting of a crosslinker, and optionally,
C) other additives, characterized in that the crosslinker component 2 is an aldehyde or an aldehyde-liberating compound.

The polymer of component 1 preferably consists of
  a) 1–80, more preferably 1–60, and most preferably from 1 to 20 mole-% of free-radical-polymerizable monomers containing amide groups, and
  b) 20–99, more preferably 40–99, and most preferably 80–99 mole-% of partially neutralized, free-radical-polymerized monomers containing carboxyl groups.

For example, monomers according to a) containing amide groups are (meth)acrylic acid amides such as acrylamide, methacrylamide, and vinyl carboxylic acid amides such as N-vinylformamide and N-vinylacetamide. Preferably, acrylamide is used.

As carboxyl group-containing monomers according to b), methacrylic acid, maleic acid, fumaric acid, itaconic acid and the salts and mixtures thereof are possible in addition to acrylic acid. For example, sodium, potassium, ammonium, alkylammonium, alkanolammonium or mixtures thereof are possible as counter ions. As monomer containing carboxyl groups, acrylic acid with sodium as counter ion is preferably used.

Among other things, the carboxyl group neutralization degree of the polymers of the invention has crucial impact on the swelling properties and the retention of the crosslinked swelling pastes and is preferably at least 25, more preferably at least 50 mole-%. According to the invention, the neutralization of the carboxyl groups may be carried out prior to or after polymerization, and frequently, part of the neutralizing agent is added prior to polymerization and the rest afterwards. In any event, however, care must be taken that the addition of alkali does not give rise to unintended saponification of the monomers containing amide groups. In the polymer already produced, on the other hand, it may be quite reasonable to generate amine groups by acidic saponification of the moieties formed from, e.g., vinyl carboxylic acid amides, which in turn are capable of undergoing a crosslinking reaction with crosslinker component 2.

In addition to the monomers a) and b), the polymer component 1 may have c) 0–49 mole-% of other anionic or non-ionic monomers polymerized therein, such as (meth)allylsulfonic acid, vinyl-sulfonic acid, 2-acrylamido-2-methyl-l-propanesulfonic acid, mono(meth)acrylic esters of alcohols, vinyl esters, alkyloxethylates or alkylphenoloxethylates. The comonomers are used to modify the polymer properties, e.g., to improve the adherence to the support material, increase the salt stability, or adjust the flexibility.

In the production of the swelling pastes of the invention, the polymers are mostly used in the form of from 15 to 60 wt.-%, preferably from 20 to 40 wt.-% aqueous solutions. In special cases, such as the production of films, it may be necessary to add alcoholic additives to the aqueous phase, which improve film formation.

The production of the copolymers is according to prior art and is effected either by adiabatic or isothermal polymerization of the solution of monomers, where the neutralization may take place partially or completely as early as in the monomer solution or as late as in the finished polymer. Typically, the polymerization is started using a redox pair as initiator or a thermal initiator or a mixture of both. Typical redox pairs which are used particularly in the polymerization in aqueous solution are: hydrogen peroxide/ascorbic acid, sodium persulfate/sodium bisulfite; hydroxylamine hydrochloride/hydrogen peroxide; ascorbic acid/t-BHP, redox systems including metal salts, and other well-known systems. If the polymerization is carried out in organic solvents, organic peroxides are frequently used, optionally in combination with redox partners. For molecular weight control, it may be reasonable to employ chain-transferring compounds, so-called modifiers, such as mercaptoethanol, thioglycolic acid or others.

In some cases it has proven convenient to pre-crosslink the copolymers to be used according to the invention with minor amounts of free-radical crosslinking monomers during their production, with the proviso that no water-insoluble fractions are formed. The aqueous solutions of these slightly pre-crosslinked polymers may impart favorable Theological properties to the swelling paste of the invention for processing, among others, or otherwise improve the film and swelling properties of the crosslinked final product.

Component 2 acts as a crosslinker, linking the individual polymer chains in a Mannich reaction through the acrylamide functions incorporated therein, to yield a water-insoluble yet water-swellable network. All the water-soluble or readily water-dispersible compounds having at least one aldehyde function or those compounds liberating aldehyde groups in the presence of water and upon heating are possible as crosslinkers. Examples to be mentioned herein are formaldehyde, hexamethylenetriamine, acetaldehyde, paraldehyde, glyoxal, trimeric glyoxal hydrate and glyoxylic acid.

The swelling paste is produced by mixing the aqueous polymer solution (component 1) and the crosslinker (component 2) and may be processed directly thereafter. Frequently, it has proven advantageous to add the crosslinker component in the form of a solution as well. The weight ratio of polymer to crosslinker in the swelling paste may vary within a broad range. The content of crosslinker relative to the polymer usually ranges from 1 to 15 wt.-%, preferably from 1 to 9 wt.-%. Depending on the content of amide group-bearing monomers of the polymer, more or less crosslinker is required in order to furnish the desired swelling and retention properties. Likewise, the crosslinking activity of the crosslinker in the amount to be used must be considered. A person skilled in the art may easily determine the precise amounts of crosslinker in the course of a product optimization.

To adjust the desired viscosity of the swelling pastes of the invention, dilution with water or addition of thickeners or surfactants is known to the person of average skill in the art. In contrast to the mixtures according to the teaching of the German application DE 195 21 431 A1, the swelling paste may be stored for several weeks with no loss of quality, which clearly facilitates the production process. Moreover, the handling of highly toxic, cancerogenic or mutagenic crosslinkers by the final user frequently lacking the practice in dealing with these substances is no longer necessary, but has been required according to the state of the prior applications EP 188,091, EP 357,474 and DE 195 21 431.

The swelling paste may contain further additives having advantageous effects, which are not polymerized therein. In particular, substances for reducing the brittleness (hardness) of the dried product, those for tack reduction, for improving the printing viscosity, and for increasing the conductivity are possible. Thus, in order to improve the gel stability and to adjust the desired printing viscosity, common thickeners effective in water, such as cellulose derivatives or more highly crosslinked polyacrylates, e.g., those sold by the Stockhausen company under the designation of "Cabloc CTF" may be added. They do not swell in the polyacrylate solution as usual, yet improve significantly the viscosity behavior during the printing process.

The swelling paste thus produced may be applied on a prefabricated sheet material, fabric, fleece or on filaments according to well-known methods. Here, imprinting or knife coating on fabrics or nonwovens using a template is preferred in order to achieve a uniform pattern.

Subsequently, the polymer thus coated must be subjected to crosslinking, which may be achieved by a thermal treatment. The duration of the thermal treatment depends on the applied temperature, the concentration of the selected crosslinker and the molar ratio of the amide moieties incorporated in the polymer chains. The temperature may be between 100° C. and 160° C., preferably 130–160° C., more preferably between 140 and 150° C. In any event, the crosslinking temperature must be above the boiling point of the solvent (water) and below the shrinking temperature of the supporting substrate. For economic reasons, the available time period is below 5 minutes, preferably below 2 minutes.

After crosslinking, the swelling paste of the invention advantageously has a retention of at least 25 g/g, preferably at least 60 g/g, and in addition, has a swelling height per 10 g/m$^2$ coated dry substance—likewise after crosslinking—of at least 0.8 mm, preferably at least 1.0 mm, and more preferably at least 1.5 mm.

The production of support-free films is effected in such a way that initially, the swelling paste is coated on a support material, preferably one made of metal or plastic, optionally using release agents. After solvent removal, optionally effected below the boiling point of the solvent, and thermal crosslinking, the film is removed from the support material, often subsequent to previous conditioning.

The finished substrate may find use in various industrial fields, such as the cable industry, the hygienics industry, in food packaging, in landscaping applications, in the clothing industry, or even in the burial business.

In order to test the various swelling pastes, each of them was knife-coated on a polyester fabric on a comber table using a template and subsequently dried in a Heraeus circulating air oven. A uniform pattern of dots was constantly obtained. Here, the dried paste was subject to some laboratory-inherent fluctuations.

Application-technical measurements

Measurement of swelling height and swelling rate

To measure the swelling height and the swelling rate, a circular piece (25.4 cm) of the coated sheet material is placed in a plastic beaker having an inner diameter of 80.5 mm and a height of 30 mm. First, two thin polyester fleeces (0.5 mm in thickness) and then a round piston having a diameter of 80 mm and a weight of 100 g are placed on top of the above fleece. The piston has 60 through borings of 2 mm diameter each. During measurement, the level of the piston upper edge is observed. 75 ml of di-ionised water (conductivity: <0.1 mS) is placed in the beaker, and the rise of the piston upper edge after 1 and 10 minutes, respectively, is recorded (double determination), the piston upper edge prior to addition of the water being taken as zero level. In order to eliminate the influence of the varying coated amounts, the swelling height relative to 10 g/m² of coated polymer is calculated in a single arithmetic step.

Determination of retention

In order to determine the retention, a circular piece of the printed fabric having a diameter of 3 cm is welded in a commercially available tea bag. The bag is immersed in a dish with distilled water for thirty minutes, suspended for 10 minutes and centrifuged at 1,200 rpm in a commercially available spin dryer for 5 minutes. The weight of the centrifuged tea bag is determined. To calculate the retention, the weight of the dry tea bag including the fabric is subtracted from the weight of the centrifuged tea bag and divided by the weight of the imprinted polymer.

EXAMPLES

Example 1

1,000 g of a solution of a copolymer of 90 mole-% acrylic acid and 10 mole-% acrylamide, having a neutralization degree of 50%, a dry substance of 25 wt.-% and an average molecular weight of 200,000 g/mol, is stirred with 37.5 g of 40% glyoxal. The paste obtained has a viscosity of 9,700 mPa·s (determined at 20° C. using a Brookfield viscosimeter spindle 4/10 rpm) and is printed on a polyester fabric after one hour, using a template. Each of the printed substrates is heated for two minutes on a tenter in a Heraeus brand circulating air oven. The following results were obtained:

| Example | Coated dry substance (g) | Temperature (° C.) | Swelling height after 1 min (mm) | Swelling height after 10 min (mm) | Swelling height per 10 g/m² (mm) | Retention (g/g) |
|---|---|---|---|---|---|---|
| 1a | 17.0 | 145 | 1.1 | 2.55 | 1.5 | 97.5 |
| 1b | 14.3 | 150 | 2.1 | 2.35 | 1.6 | 71.7 |
| 1c | 11.5 | 155 | 2.1 | 2.3 | 2.0 | 60.5 |

Example 2

The mixture of Example 1, which was formulated ready-to-use but not used, was stored at room temperature for one week and thereafter, had a viscosity of 10,200 mP·s 20° C., Brookfield spindle 4/10 rpm). Again, the paste was processed as described in Example 1:

| Example | Coated dry substance (g) | Temperature (° C.) | Swelling height after 1 min (mm) | Swelling height after 10 min (mm) | Swelling height per 10 g/m² (mm) | Retention (g/g) |
|---|---|---|---|---|---|---|
| 2 | 14.2 | 145 | 2.05 | 2.60 | 1.8 | 84.9 |

Example 3

The paste of Example 1 was stored for a total of 4 weeks. After this storage period, the paste had a viscosity of 9,600 mPa s. Processing was as described in Example 1:

| Example | Coated dry substance (g) | Temperature (° C.) | Swelling height after 1 min (mm) | Swelling height after 10 min (mm) | Swelling height per 10 g/m² (mm) | Retention (g/g) |
|---|---|---|---|---|---|---|
| 3 | 17.4 | 145 | 1.0 | 2.65 | 1.5 | 87.0 |

Example 4

100 g of the aqueous copolymer solution of Example 1 is mixed with 3.83 g of glyoxylic acid (50% in water) instead of glyoxal and processed as described in Example 1 after a one day storage.

| Example | Coated dry substance (g/m²) | Temperature (° C.) | Swelling height after 1 min (mm) | Swelling height after 10 min (mm) | Swelling height per 10 g/m² (mm) | Retention (g/g) |
|---|---|---|---|---|---|---|
| 4a | 17.6 | 135 | 0.7 | 1.4 | 0.8 | 160 |
| 4b | 14.3 | 140 | 1.0 | 2.35 | 1.6 | 101 |
| 4c | 12.9 | 145 | 1.7 | 1.95 | 1.5 | 84.9 |
| 4d | 14.9 | 150 | 1.2 | 1.6 | 1.1 | 48.2 |
| 4e | 15.3 | 155 | 0.9 | 1.4 | 0.9 | 35 |

Example 5

100 g of a solution of a terpolymer of 94 mole-% acrylic acid, 5 mole-% acrylamide and 1 mole-% methoxypolyethylene glycol (1,000) methacrylate (Bisomer S 10W), neutralization degree 50%, dry substance 25%, viscosity 11,000 mPa·s, was stirred with 3.75 g of 40% glyoxal and further processed as described in Example 1.

| Example | Coated dry substance (g/m²) | Temperature (° C.) | Swelling height after 1 min (mm) | Swelling height after 10 min (mm) | Swelling height per 10 g/m² (mm) | Retention (g/g) |
|---|---|---|---|---|---|---|
| 5 | 7.8 | 150 | 0.9 | 1.5 | 1.9 | 180 |

Example 6

100 g of the copolymer solution of Example 1 was mixed with 3 g of hexamethylenetetramine and processed as described in Example 1.

| Example | Coated dry substance (g/m²) | Temperature (° C.) | Swelling height after 1 min (mm) | Swelling height after 10 min (mm) | Swelling height per 10 g/m² (mm) | Retention (g/g) |
|---|---|---|---|---|---|---|
| 6a | 15.0 | 150 | 1.65 | 1.5 | 1.0 | 29 |
| 6b | 14.3 | 160 | 1.6 | 1.5 | 1.0 | 27 |

Example 7

Example 6 was repeated, except that prior to the hexamethylenetetramine addition, the neutralization degree of the copolymer used was increased to 60 and 70 mole-%, respectively, using sodium hydroxide solution.

| Example | Coated dry substance (g/m$^2$) | Neutralization degree (mole-%) | Swelling height after 1 min (mm) | Swelling height after 10 min (mm) | Swelling height per 10 g/m$^2$ (mm) | Retention (g/g) |
|---|---|---|---|---|---|---|
| 7a | 15.0 | 60 | 1.9 | 1.65 | 1.1 | 67.6 |
| 7b | 16.6 | 70 | 1.0 | 1.3 | 0.8 | 92.7 |

Example 8

The swelling paste of Example 4 was diluted 1:1 with distilled water and subsequently coated onto aramide fibers. The aramide fibers thus treated were subjected to a short thermal treatment using a hot-air hairdryer. Thereby obtaining a water or water proof polymer coating of 16 wt.-% the treated aramide fibers were subjected to a swelling test as described in EP 482,703, page 5, from line 50 on. The product was immediately tight and even so until the end of testing after 6 days.

Comparative Example 1

The polymer of Example 1 was mixed with 2 wt.-% of ethylene glycol diglycidyl ether. The product mixture had an initial viscosity of 11,000 mPa·s. After only 4 hours of storage at room temperature, the viscosity had risen to 27,000 mPa·s. After a storage period of 48 hours, the product was completely crosslinked and could only be removed piece by piece from the storage flask with massive effort, using a sharp-edged tool.

Comparative Example 2

A polymer comparable to that of Example 1, having a viscosity of 20,200 mPa·s, was used, with the difference that this was a pure homopolymer of acrylic acid having a neutralization degree of 50%, i.e., no amide functions are bound to the polymer chain. This polymer, in the form of a 30% aqueous solution, was mixed with 3.75 wt.-% of glyoxal and printed and dried as indicated in Example 1.

Example 9

An aqueous solution of a polymer consisting of 30 mole-% acrylic acid, 30 mole-% sodium acrylate and 40 mole-% acrylamide with a dry substance of 28% and a viscosity of 7,800 mPa·s was mixed with 0.75 wt.-% of 40% glyoxal and processed as described in Example 1. The printed fabric was heated to 150° C. in the Heraeus drying oven for 2 minutes.

| Example | Coated dry substance (g) | Temperature (° C.) | Swelling height after 1 min (mm) | Swelling height after 10 min (mm) | Swelling height per 10 g/m$^2$ (mm) | Retention (g/g) |
|---|---|---|---|---|---|---|
| 9 | 17 | 150 | 0.49 | 1.32 | 0.78 | 109 |

Example 10

An aqueous solution of a polymer consisting of 20 mole-% acrylic acid, 20 mole-% sodium acrylate and 60 mole-% acrylamide with a dry substance of 27% and a viscosity of 14,400 mPa·s, was mixed with 0.75 wt.-% of glyoxal and 0.5 wt.-% of glyoxal, respectively, and processed as described in Example 1. Drying was effected for 2 minutes at 150° C. in the Heraeus circulating air oven.

| Comparative Example | Coated dry substance (g) | Temperature (° C.) | Swelling height after 1 min (mm) | Swelling height after 10 min (mm) | Swelling height per 10 g/m$^2$ (mm) | Retention (g/g) |
|---|---|---|---|---|---|---|
| 2 | 17.8 | 150 | 0.0 | 0.15 | 0.1 | 0.0 |

| Example | Glyoxal (wt.-%) | Coated dry substance (g) | Swelling height after 1 min (mm) | Swelling height after 10 min (mm) | Swelling height per 10 g/m$^2$ (mm) | Retention (g/g) |
|---|---|---|---|---|---|---|
| 10a | 0.75 | 15.5 | 0.99 | 1.91 | 1.23 | 37 |
| 10b | 0.5 | 16.5 | 0.71 | 1.21 | 0.73 | 90 |

What is claimed is:

1. An article coated with a dried crosslinked paste, said article comprising a component selected from the group consisting of absorbent fibers, fiber bundles, filaments, fleeces, fabrics, and other prefabricated sheet materials, said article being made by applying the paste onto said article and subjecting said article to thermal treatment to dry and crosslink said paste, wherein said paste consists essentially of A) a component 1, consisting of an aqueous, partially or completely neutralized solution of a polymer produced by free-radical copolymerization of mixtures consisting essentially of
   a) 1–80 mole % of monomers containing amide groups,
   b) 20–99 mole % of monomers containing carboxyl groups and/or carboxylate groups, and,
   c) 0–49 mole % of other free-radical-polymerizable anionic or non-ionic monomers, B) a component 2, consisting of a crosslinker, and optionally, C) further additives which are not polymerizable with said polymer and said crosslinker, wherein the crosslinker component 2 is an aldehyde, or a compound that liberates aldehyde groups in the presence of water and upon heating, or hexamethylenetetramine, wherein said paste has the following properties:

(1) crosslinking of said polymer by said crosslinker being capable of occurring within 5 minutes at a temperature of at least 160° C., and (2) after being dried and crosslinked, being capable of swelling in the presence of water.

2. An article coated with a dried, crosslinked, swellable coating of a paste consisting essentially of A) a component 1, consisting of an aqueous, partially or completely neutralized solution of a polymer produced by free-radical copolymerization of mixtures consisting essentially of
   a) 1–80 mole % of monomers containing amide groups,
   b) 20–99 mole % of monomers containing carboxyl groups and/or carboxylate groups, and,
   c) 0–49 mole % of other free-radical-polymerizable anionic or non-ionic monomers, B) a component 2, consisting of a crosslinker, and optionally, C) further additives which are not polymerizable with said polymer and said crosslinker, wherein the crosslinker component 2 is an aldehyde, or a compound that liberates aldehyde groups in the presence of water and upon heating, or hexamethylenetetramine, wherein said paste has the following properties:

(1) crosslinking of said polymer by said crosslinker being capable of occurring within 5 minutes at a temperature of at least 160° C.;

(2), after being dried and crosslinked, being capable of swelling in the presence of water.

3. The article as set forth in claim 2, wherein the content of crosslinker component 2 of said paste is 1–15 wt. % relative to the employed polymer of component 1.

4. The article as set forth in claim 2, wherein said dried paste has a swelling height per 10 g/m$^2$, of at least 0.8 mm.

* * * * *